United States Patent [19]

Matoba et al.

[11] Patent Number: 5,231,567
[45] Date of Patent: Jul. 27, 1993

[54] MANUFACTURING PLANNING SYSTEM

[75] Inventors: Hideaki Matoba, Ebina; Hisashi Onari; Masahiro Watanabe, both of Yokohama, Japan

[73] Assignee: Hitachi, Ltd., Tokyo, Japan

[21] Appl. No.: 796,850

[22] Filed: Nov. 25, 1991

[30] Foreign Application Priority Data

Nov. 28, 1990 [JP] Japan ............................ 2-322305

[51] Int. Cl.$^5$ ............... G06F 15/22; G06F 15/20; G06F 15/46
[52] U.S. Cl. ............................ 364/401; 364/408; 364/468
[58] Field of Search ............... 364/401, 402, 408, 468, 364/200

[56] References Cited

U.S. PATENT DOCUMENTS

| | | | |
|---|---|---|---|
| 4,459,663 | 7/1984 | Dye | 364/200 |
| 4,958,292 | 9/1990 | Kaneko et al. | 364/468 |
| 5,093,794 | 3/1992 | Howie et al. | 364/468 |
| 5,101,352 | 3/1992 | Rembert | 364/401 |

FOREIGN PATENT DOCUMENTS 62-26509 2/1987 Japan .

OTHER PUBLICATIONS

IEEE Journal of Robotics and Automation, vol. 4, No. 4, Aug. 1988, New York US, pp. 397-402, A. Kusiak & G. Finke.
Werkstatt und Betrieb, vol. 122, No. 6, Jun. 1989, Munchen de, pp. CA131-CA134 and CA136 and CA138, R. Haase.
Siemens Power Engineering, vol. 6, No. 1, Jan.-Feb. 1984, Berlin de, pp. 73-75, Walter Asbeck.
"Parallel Distributed Processing, Explorations in the Microstructure of Cognition. vol. 1: Foundations", Rumelhart et al., pp. 318-364.

Primary Examiner—Roy N. Envall, Jr.
Assistant Examiner—Khai Tran
Attorney, Agent, or Firm—Fay, Sharpe, Beall, Fagan, Minnich & McKee

[57] ABSTRACT

A manufacturing planning system has lead time estimating function, MRP executing function, work demand calculating function, problem analyzing function, capacity adjusting function, product completion data adjusting function, and alternative shop designating function for planning a production schedule by calculating successively lead time in consideration of amount of work demanded and capacity for production, analyzing problems in the production schedule and performing relevant adjustments for solving the problems. An online display function is provided for simultaneous display of the problems and load/capacity states of production shops in association with solution of the problems and various adjustment together with the results thereof.

11 Claims, 8 Drawing Sheets

MANUFACTURING PLANNING SYSTEM

BACKGROUND OF THE INVENTION

The present invention generally relates to a manufacturing planning system. More particularly, the invention is concerned with a manufacturing planning system which incorporates functions for generation or creation of production schedules, adjustments or alterations thereof and user interfacing.

As a manufacturing planning system of the type mentioned above, there is hitherto known a system in which fixed production process sequences, a lead time (i.e. the number of days estimated as demanded for completion of a product to be manufactured) and the number of shop workdays determined on the side of a manufacturer are inputted for automatically planning an optical production schedule including optimal start and completion dates of the individual processes which are determined by counting back the number of days from a designated date at which manufacturing of the product is to be completed (hereinafter also referred to as the product completion date), as is disclosed, for example, in JP-A-62-26509.

In the known system mentioned above, the fixed process sequences and the lead time determined on the side of the manufacturer are used for creating a planned process schedule which is then displayed in comparison with a schedule which will be accompanied with the latest start date. However, this known planning system incorporates no functions for alteration and adjustment of the production schedule once established. More specifically, when there arises a fear that the schedule can not be achieved on or before the day designated for completion of the product, it becomes necessary to alter or adjust the production schedule by taking measures for shortening the period of production such as increasing the production capability or capacity by resorting to overtime work and/or operating an alternative shop. However, this sort of adjusting function is not incorporated in the known system mentioned above. It is further noted that when the production capability or capacity is changed for adjustment of the production schedule, the lead times of the individual processes will undergo corresponding changes. Similarly, alterations of the shops and the production start/completion dates will bring about changes in the lead times of the individual manufacturing processes. Consequently, in order to effectuate the alteration and adjustment of the production schedule, it is naturally required to take into consideration the change in the lead time as involved.

In the known manufacturing planning system mentioned above, the lead time itself is determined on the user side. However, in a manufacturing planning system for the manufacturing of ordered products, it is extremely difficult to determine on the user side the lead time by taking into consideration the types of the product, the appointed date of delivery and the production process or shop states, although it depends on types of constituents or parts of the ordered product of concern and multiformity of the manufacturing processes.

SUMMARY OF THE INVENTION

In the light of the state of the art described above, it is a first object of the present invention to provide a manufacturing planning system which is capable of automatically determining a lead time in consideration of product specifications, appointed date of delivery and production process states and capable of creating a production schedule on the basis of the lead time in an automated manner.

A second object of the invention is to provide a manufacturing planning system which is capable of adjusting a production schedule by changing or altering a production capability or capacity.

A third object of the invention is to provide a manufacturing planning system which is capable of adjusting a production schedule by changing or altering a product completion date.

A fourth object of the invention is to provide a manufacturing planning system which is capable of adjusting a production schedule by altering production shops.

A fifth object of the invention is to provide a manufacturing planning system which can aids a planner in his or her decision-making for adjustment or alteration of a production schedule.

In view of the above and other objects which will become apparent as description proceeds, there are provided according to aspects of the invention the system arrangements summarized below.

1. In order to perform the production capacity adjustment while calculating sequentially the lead time by taking into consideration an amount of work as demanded (hereinafter referred to as the work demand) and the capacity, there are provided a lead time estimating module, a material requirement planning (MRP) execution module, a work demand calculating module, a problem analyzing module, a production capability (capacity) adjusting module, a data input/output unit and a data storage.

2. For generating or creating automatically a production schedule, there are provided an initial plan data generating module, a master production schedule (MPS) creating module and a work demand estimating module in addition to the lead time estimating module, the MRP executing module, the data storage and the data input/output unit mentioned above.

3. For realizing the production schedule adjustment or alteration by changing the product completion date, there is provided a product completion date adjusting module in addition to the lead time estimating module, the MRP executing module, the work demand calculating module and the data storage.

4. For realizing the production schedule adjustment by changing or altering the production shop, there is provided an alternative shop adjusting module in addition to the lead time estimating module, the MRP executing module, the work demand calculating module and the data input/output unit.

Through series of operations of the individual modules or units mentioned above, the functions contemplated by the invention can be realized in such manners as described below.

1. A planner or an operator may enter a command for adjustment of the production capacity through the medium of the data input/output unit. The production capacity adjusting module adjusts the capacity in accordance with the capacity adjusting command. The result of the adjustment is transferred to the lead time estimating module, which responds thereto for fetching the current work demand and the production capacity from the data storage unit and then estimates an updated lead time in consideration of adjustment of the capacity. The result of the lead time estimation is stored in the data storage. Further, the production capacity adjusting module issues a MRP execution command to the MRP executing module, which responds thereto by fetching data required for MRP execution from the data storage and executing the MRP calculation, the result of which is stored in the data storage as well. Additionally, the MRP executing module issues a command for calculation of the work demand to the work demand calculating module, which responds thereto for thereby calculating the work demand for the adjusted production schedule. The result of this calculation is stored in the data storage. The data input/output unit fetches the result of the MRP execution from the data storage to display it in a predetermined format.

2. A planner or an operator may input a command for generation of initial plan data to the initial plan data generating module through the data input/output unit. In response, the initial plan data generating module first issues a master production schedule (MPS) generating command to the MPS generating module, which then responds thereto by fetching data of the product specifications, the appointed date of delivery and the production process states for generating an MPS, the result of which is stored in the data storage. Subsequently, the initial plan data generating module issues a command for estimation of the work demand to the work demand estimating module, which responds thereto by fetching the MPS from the data storage to estimate the work demand, the result of which is then stored in the data storage. Next, the initial plan data generating module issues a command for estimation of the lead time to the lead time estimating module, which responds thereto by fetching the current work demand and the production capacity from the data storage to estimate an updated lead time, the result of which is again stored in the data storage. Finally, the initial plan generating module issues a MRP execution command to the MRP execution module, which responds thereto by fetching from the data storage the data which are required for executing the MRP calculation, the result of which is then stored in the data storage as the initial plan data.

3. A planner may issue a product completion date adjusting command to the completion date adjusting module through the input/output unit, which then adjusts the product completion data. The result of the adjustment is transferred to the MRP executing module together with a MRP execution command. The MRP executing module fetches data required for execution of the MRP from the data storage. After execution of the MRP calculation, the result thereof is stored in the data storage. Further, the MRP executing module issues a work demand calculation command to the work demand calculating module, which responds thereto for calculating the work demand for the adjusted or updated production schedule, the result of which is stored in the data storage. The data input/output unit fetches therein the result of the MRP execution to display it in a predetermined format.

4. A planner may issue an alternative shop adjustment command to the alternative shop adjusting module with the aid of the input/output unit. The alternative shop adjusting module adjusts the alternative shop, the result of which is transferred to the MRP executing module together with a MRP execution command. In response, the MRP executing module fetches data required for the MRP execution from the data storage for performing the MRP calculation, the result of which is stored in the data storage. Further, the MRP executing module issues a work demand calculation command to the work demand calculating module which responds thereto for calculating the work demand for the adjusted for updated production schedule, the result being stored in the data storage. The data input/output unit fetches the result of the MAP execution from the data storage to display it in a predetermined format.

5. A planner may issue a problem analysis command to the problem analysis module with the aid of the data input/output unit. In response, the problem analysis module fetches therein the result of the MRP execution from the data storage to analyze the problem. The result of the analysis is displayed by the input/output unit in a predetermined format.

6. A planner may input a lead time estimation command to the lead time estimating module through the data input/output unit. In response, the lead time estimating module fetches therein the current work demand and production capacity from the data storage to estimate an updated lead time. The result of this estimation is stored in the data storage as well.

7. A planner may issue a MRP execution command to the MRP executing module through the data input/output unit. In response, the MRP executing module fetches data required for the MRP execution and performs a MRP calculation, the result of which is stored in the data storage. Additionally, the MRP executing module issues a work demand calculation command to the work demand calculating module, which responds thereto by calculating a work demand for the adjusted or updated production schedule, the result of which is also stored in the data storage. The data input/output unit fetches the result of the MRP execution from the data storage for displaying it in a predetermined format.

By virtue of the functions provided according to the teachings of the invention, there can be realized an improved manufacturing planning system which is capable of determining the lead time by taking into account the work demand and the capacity to thereby present the result of adjustment of the production schedule with enhanced accuracy and reliability.

DESCRIPTION OF THE PREFERRED EMBODIMENTS

Now, the present invention will be described in detail in conjunction with preferred or exemplary embodiments thereof by reference to FIGS. 1 to 8.

Figure 1:
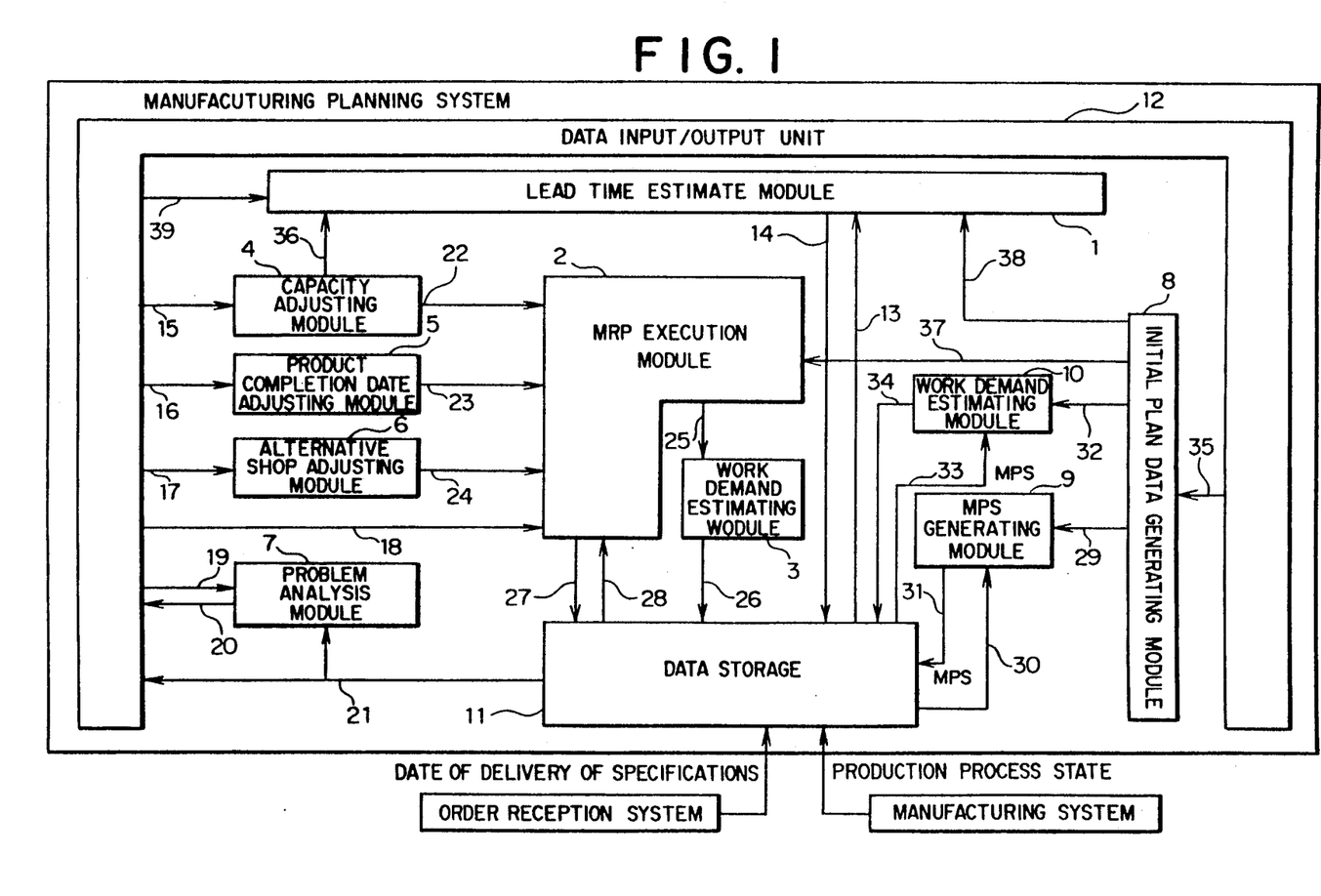
FIG. 1 is a block diagram showing a general arrangement of a manufacturing planning system according to an embodiment of the invention.

FIG. 1 is a block diagram showing a general arrangement of a manufacturing planning system according to an embodiment of the invention. Referring to the figure, the illustrated system comprises a lead time estimating module 1 for estimating or predicting a lead time 14 on the basis of production capacity/work demand data 13, an MRP executing module 2 for executing a MRP (Material Requirements Planning) in response to one of MRP execution commands 18, 22 and 37 or a MRP execution command 23 issued as a result of a product completion date adjustment or a MRP execute command 24 resulting from an alternative shop adjustment on the basis of data for MRP calculation indicated by 28 to thereby output a result of the MRP execution indicated at 27 together with a work demand calculation command 25, a work demand calculating module 3 for calculating a work demand (an amount of the work as demanded for manufacturing) 26 in response to the work demand calculation command 25, a production capacity adjustment module 4 for performing a production capacity adjustment in response to the production capacity adjustment command 15 to thereby output a capacity adjustment result 36 together with the above-mentioned MRP execution command 22, a product completion data adjusting module 5 for adjusting the product completion date (i.e. the date at which the product is to be completed) in response to a product completion date adjusting command 16 to thereby output the result of the production completion date adjustment together with the MRP execution command 23 mentioned above, an alternative shop adjusting module 6 for performing an adjustment in response to an alternative shop adjust command 17 to thereby output an alternative shop adjustment result together with the above-mentioned MRP execution command 24, a problem analysis module 7 for analyzing a problem on the basis of the result of the MRP execution in response to a problem analysis command 19 to thereby output the result of problem analysis as indicated at 20, an initial plan data generating module 8 which responds to an initial plan data generate command 35 for thereby outputting sequentially a MPS (Master Production Schedule) creation command 29, a work demand estimate command 32, a lead time estimate command 38 and a MRP execute command 37, a MPS creating module 9 which responds to a MPS create command 29 to thereby create a MPS 31 to be outputted on the basis of product specifications, the appointed date of delivery and production process states 30, a work demand estimating module 10 which responds to a work demand estimate command 32 to thereby estimate the work demand (i.e. amount of works demanded for the manufacturing) 34 in accordance with the MPS 33, a data storage unit 10 for storing a variety of data mentioned above, and a data input/output unit 12.

At first, description will be directed to the function of the problem analysis module 7 of the manufacturing planning system shown in FIG. 1.

The data input/output unit 12 may be constituted by a conventional unit used in a computer system such as exemplified by an interactive type data input/output unit including a CRT display equipped with a keyboard and a mouse.

Figure 2:
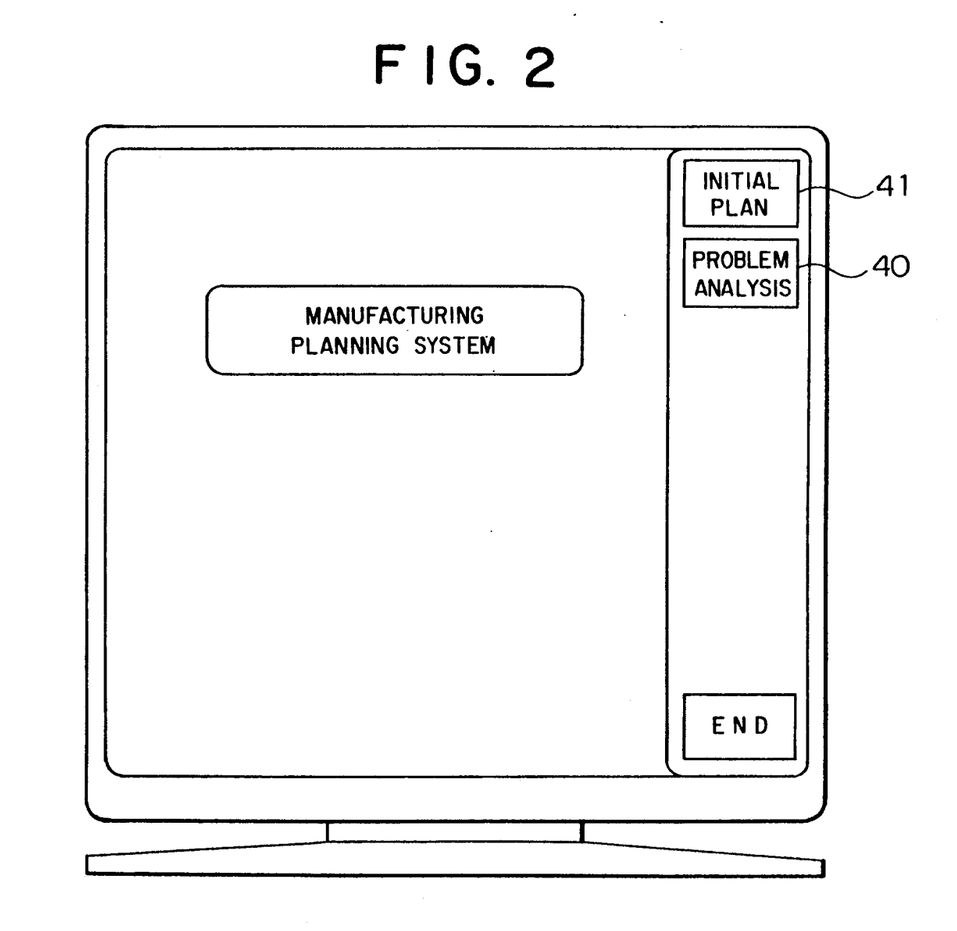
FIG. 2 is a view showing an example of a problem analysis command generated on a display.

FIG. 2 is a plan view showing an example of the problem analysis command. In a command menu as displayed on the CRT screen shown in FIG. 2, a command 40 "PROBLEM ANALYSIS" is picked up by using the mouse for validating the problem analysis command 19 shown in FIG. 1.

The problem analysis module 7 responds to the problem analysis command 19 to fetch data 21 resulting from execution of MRP from the data storage module 11.

The MRP execution result data includes a purchase schedule table (listing items or parts, quantities, appointed date of delivery, etc.) for a product as ordered and a manufacturing schedule table (listing parts, quantities, appointed date of delivery).

The problem analysis module 7 consults the purchase schedule table and the manufacturing schedule table to prepare a list of parts (containing the number of parts, quantities thereof, appointed date of delivery, difference between scheduled date of completion and the appointed date) for the product for which the scheduled date of completion can not be met unless the purchase command and the manufacturing start command were issued prior to the current time point, whereupon the results of the problem analysis are outputted to the data input/output unit 12 as indicated at 20.

Figure 3:
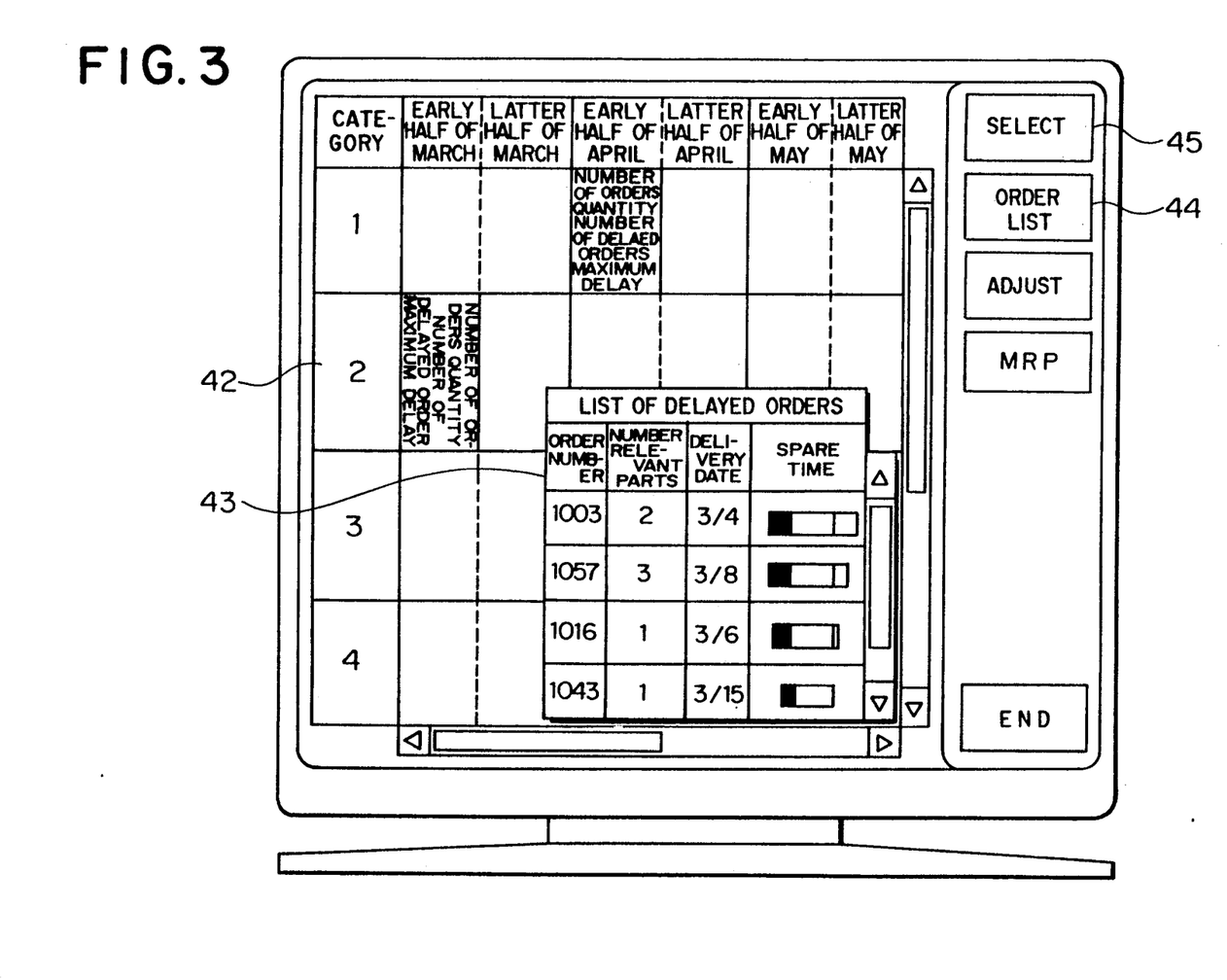
FIG. 3 is a similar view showing the first example of data resulting from a problem analysis.

FIG. 3 shows an example of data resulting from the problem analysis as displayed. In this figure, a reference numeral 42 denotes a problem display table in which time is taken along the abscissa on a half-month basis with categories of products being taken along the ordinate.

Of the orders for which scheduled dates of completion fall within ranges represented by matrices partitioned by the vertical and horizontal axes, the order for which the appointed date of delivery can not be met is displayed in a color of high density. In that case, there is additionally displayed information indicating the situations surrounding the problem, such as the number of orders, quantities, the number of delayed orders and maximum delay.

Detailed information within the matrix associated with the order suffering the problem can be referred to through procedure which will be described below.

① Determination of matrix containing detailed information to be referred to:

With the aid of the mouse, the matrix of concern is picked up. In the case of the display of FIG. 3, it is shown that a matrix or block identified in terms of period "earlier half of March" and "Category 2" has been picked.

② Display of delayed order list:

From the command menu, "ORDER LIST" 44 is picked, whereby a delayed order list table 43 is displayed. This table 43 contains information of the order (ID) numbers identifying the orders delayed, the number of parts which brought about delays for the products of the these orders (hereinafter referred to as the related part number), the appointed date of delivery and delay/spare-time. Details of the information "delay/spare-time" will be explained later on.

Figure 4:
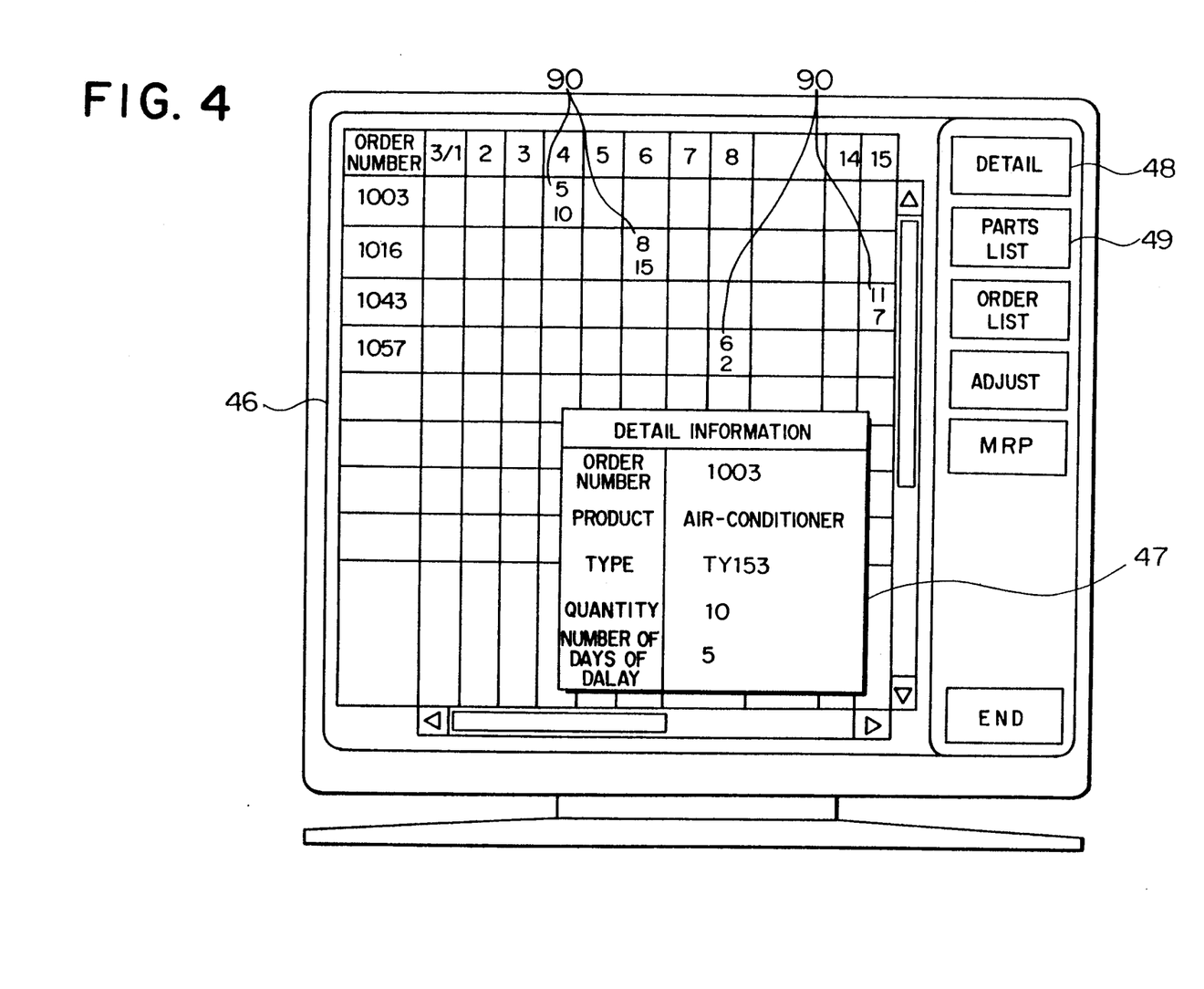
FIG. 4 is a similar view showing the second example of data obtained from the problem analysis.

FIG. 4 shows another example of the output display resulting from the problem analysis. In the figure, a reference numeral 46 designates an order number/date-based problem occurrence location indicating table in which date is taken along the abscissa with the order (ID) number being taken along the ordinate. The period as displayed corresponds to that shown in FIG. 3, i.e. earlier half of March with the category being "2".

In the order number/date-based problem occurrence location indicating table 46, matrices colored in high density represent the locations where the problem takes place, wherein as the information indicating the situations surrounding the problem, there are displayed the number of maximum delay (upper) 90 together with the number of parts (lower) 90 involving the delay for the product suffering from the maximum delay.

For designating the display of the order number/date-based problem occurrence location indicating table 46, this can be realized by picking menu item "SELECT" 45 of the command menu shown in FIG. 3 after determination of the detailed information reference matrix.

Detailed information of the problem indicating matrix in the order number/date-based problem occurrence location indicating table 46 can be referred to through procedures described below.

① Determination of detailed information reference matrix:

The matrix containing the detailed information to be referred to is picked by using the mouse. In FIG. 4, it is shown that the matrix identified by the period "1" and the order number "1003" is picked.

② Indication of detailed information:

In the command menu, a command "DETAIL" 48 is picked. By picking this command, a detailed information list table 47 is displayed. The detailed information list table 47 contains a product name of the designated order number, a type, quantity and the number of days corresponding to the maximum delay.

Figure 5:
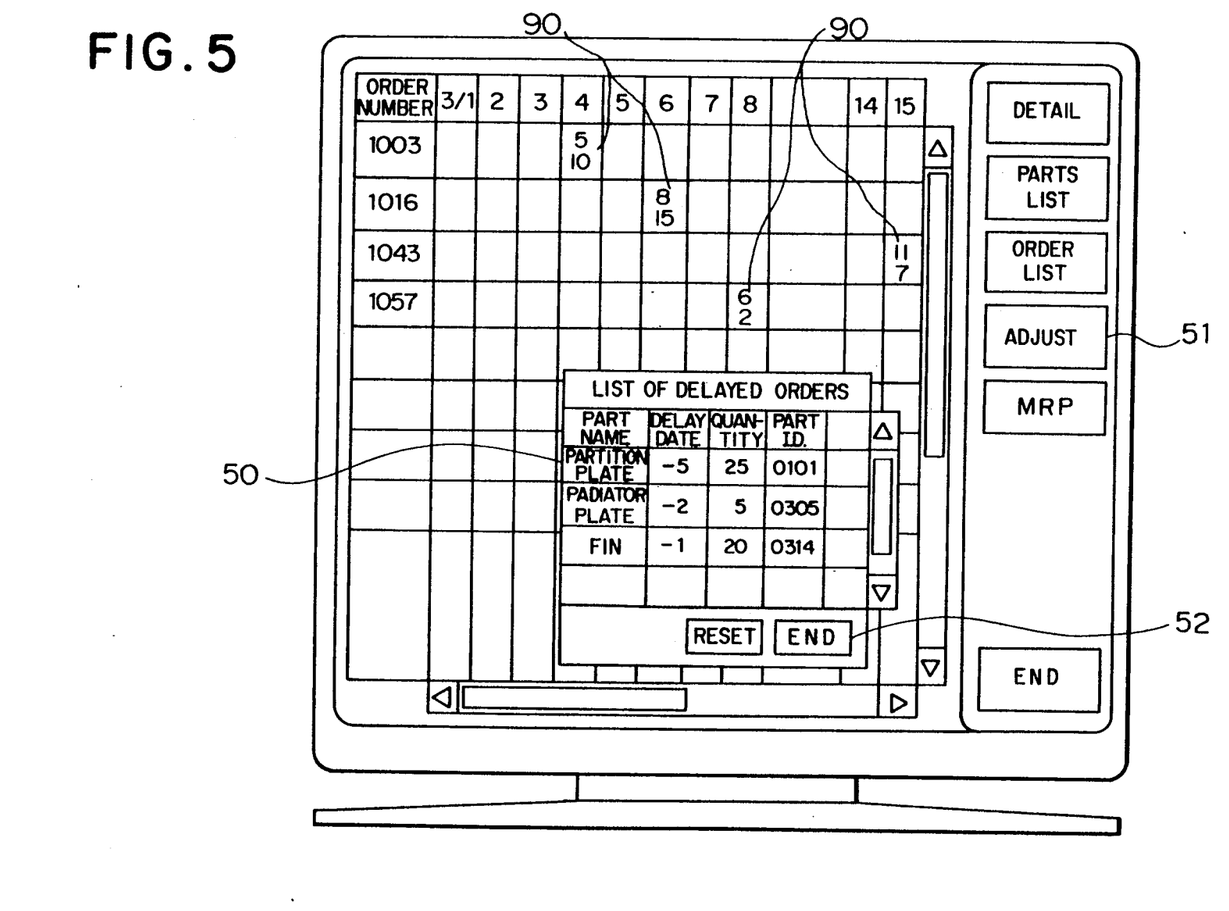
FIG. 5 is a similar view showing the third example of data resulting from the problem analysis.

③ Display of delayed parts list:

A delayed part list 50 shown in FIG. 5 is displayed in place of the detailed information table 47 by picking a menu command "PARTS MENU LIST" with the mouse. In this table 47, there are contained the delays in terms of the number of days for all the parts bringing about the delay for the product of the designated order number, quantities and part identification numbers.

Figure 6:
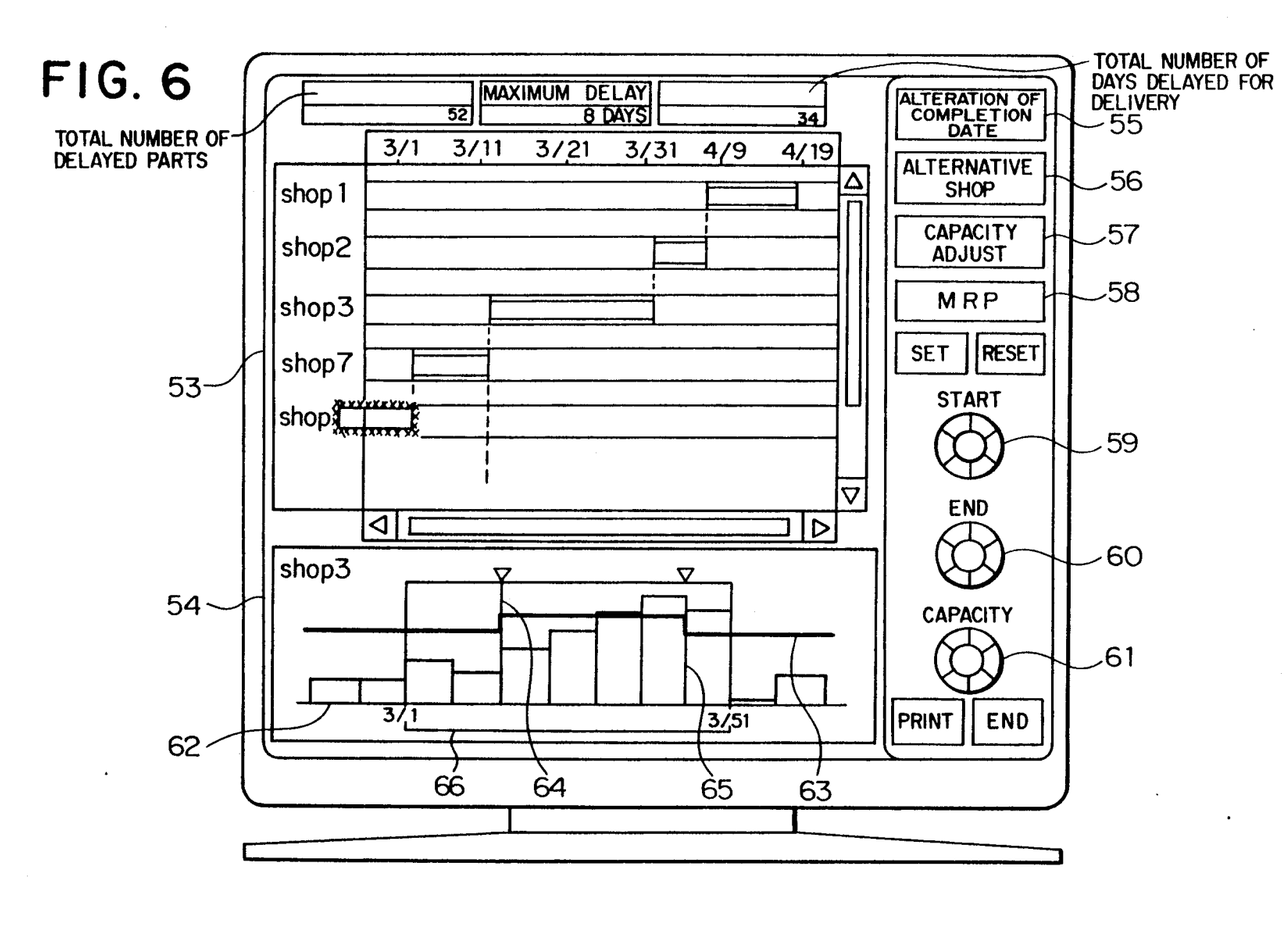
FIG. 6 is a view showing an example of display of a production capacity adjustment.

Next, description will be turned to a method of adjusting the production schedule by altering or adjusting the production capability or capacity. FIG. 6 shows an example of display of the production capacity alteration.

The display shown in FIG. 6 contains a critical path indicating field 53, a production capacity indicating field 54, a product completion date changing menu 55, an alternative shop changing menu 56, a capacity adjustment changing menu 57, an MRP execution designation changing menu 58, a production capacity alteration start time setting dial 59, a capacity alteration end time setting dial 60, a capacity setting dial 61 and others.

The critical path display 53 can be generated through the procedure described below.

① Selection of concerned part:

A part of concern (i.e. part providing a cause for the delay) is selected for adjustment of the production schedule. By way of example, "PARTITION PLATE" in the delay involving part list 50 shown in FIG. 5 is picked with the mouse, and subsequently a button "END" 52 also shown in FIG. 5 is picked with the mouse. In this manner, as the part of concern (i.e. part to be coped with), a partition plate is selected.

② Designation of adjustment of production schedule:

A menu command "ADJUSTMENT" 51 is picked with the mouse from the command menus shown in FIG. 5.

③ Problem analysis:

Through the data input/output unit 12 shown in FIG. 1, a problem analysis command 19 is issued. In response to this command, the problem analysis module 7 fetches the MRP execution result data 21 from the data storage 11.

Further, the problem analysis module 7 determines the critical path relating to the part of concern selected in the step 1, i.e. the shop and the load thereof, whereupon the result 20 is transferred to the data input/output unit 12.

④ Display of critical path:

The data input/output unit 12 displays the problem analysis result data 20 in a predetermined format.

The critical path display field 53 further serves for the functions mentioned below.

① The critical path display 53 displays only the critical path or shop which relates to the part of concern.

② The display field 53 displays the state or level of the load (work demand/capacity) of each shop on a period basis in a distinct color.

③ The display field 53 displays the production period relating to the part of concern in superposition on the display mentioned in the paragraph 2.

By implementing the critical path display field 53 with the functions ① to ③ mentioned above, the manufacturing scheduler or planner can easily understand the critical path and make decisions concerning the appropriate measures to be taken, starting from the location or shop imposed with a heavier load.

Adjustment of the production schedule by changing the production capacity is executed through procedure mentioned below.

① Selection of process for which production capacity is to be altered:

In the critical path display field 53, a process or production line of which capacity is to be changed is picked with the mouse. For example, a position of the shop 3 enclosed by a solid thick line in FIG. 6 is picked with the mouse.

② Generation of production capacity display part 54:

The state of load and the capacity of the process selected in step 1 are displayed in such a format as indicated on the capacity display field 54. This display field 54 contains information of the load state or level 62, a capacity curve 63, a capacity change start point 64, a capacity change end point 65 and a capacity change duration indicating frame 66.

③ Setting of capacity change start/end point:

By picking a capacity change start time setting dial 59 and a capacity change end time setting dial 60 with the mouse, the capacity change start point 64 and the capacity change end point 65 are displaced to the left or the right. In the case of a two-button type mouse, actuation of the left-hand button causes the capacity change start/end points to be moved to the left while operation of the right-hand button results in the rightward displacement of these points.

④ Change of capacity:

By picking the capacity setting dial 61 with the mouse, the capacity of a section or interval between the capacity change start point 64 and the capacity change end point 65 is changed. In the case of the two-button type mouse mentioned above, actuation of the left button causes the capacity curve 63 to be moved downwardly (in the direction to decrease the capacity) while that of the right button moves the curve 63 upwardly (in the direction to increase the capacity).

⑤ Change of lead time:

On the basis of the result of the capacity change in the step 4, the data input/output unit 12 shown in FIG. 1 issues a capacity adjust command 15 to the capacity adjusting module 4, which then supplies the capacity adjustment data 36 to the lead time estimating module 1. This module then updates the lead time on the basis of the capacity data, the work demand 13 and the capacity adjustment data 36 supplied from the data storage 11 and stores the updated lead time to the latter.

⑥ Execution of MRP calculation:

The capacity adjusting module 4 issues a MRP execution command to the MRP execution module 2, which then executes the MRP calculation on the basis of the MRP data 28 supplied from the data storage unit 11. The result 27 of this calculation is outputted to the data storage 11. Further, the MRP executing module 2 outputs a work demand calculation command 25 to the work demand calculating module 3. The result 26 of this calculation is outputted from the module 3 to the data storage 11.

⑦ Change of critical path display:

The data input/output unit 12 fetches the MRP execution result data 21 from the data storage 11 to thereby change the display concerning the production period of the part of concern correspondingly.

Through the procedure including the steps ① to ⑦ mentioned above, the planner can change or modify the production capacity through facilitated manipulation and at the same time can confirm on an on-line basis the influence which the change of the capacity affects the production schedule.

Figure 7:
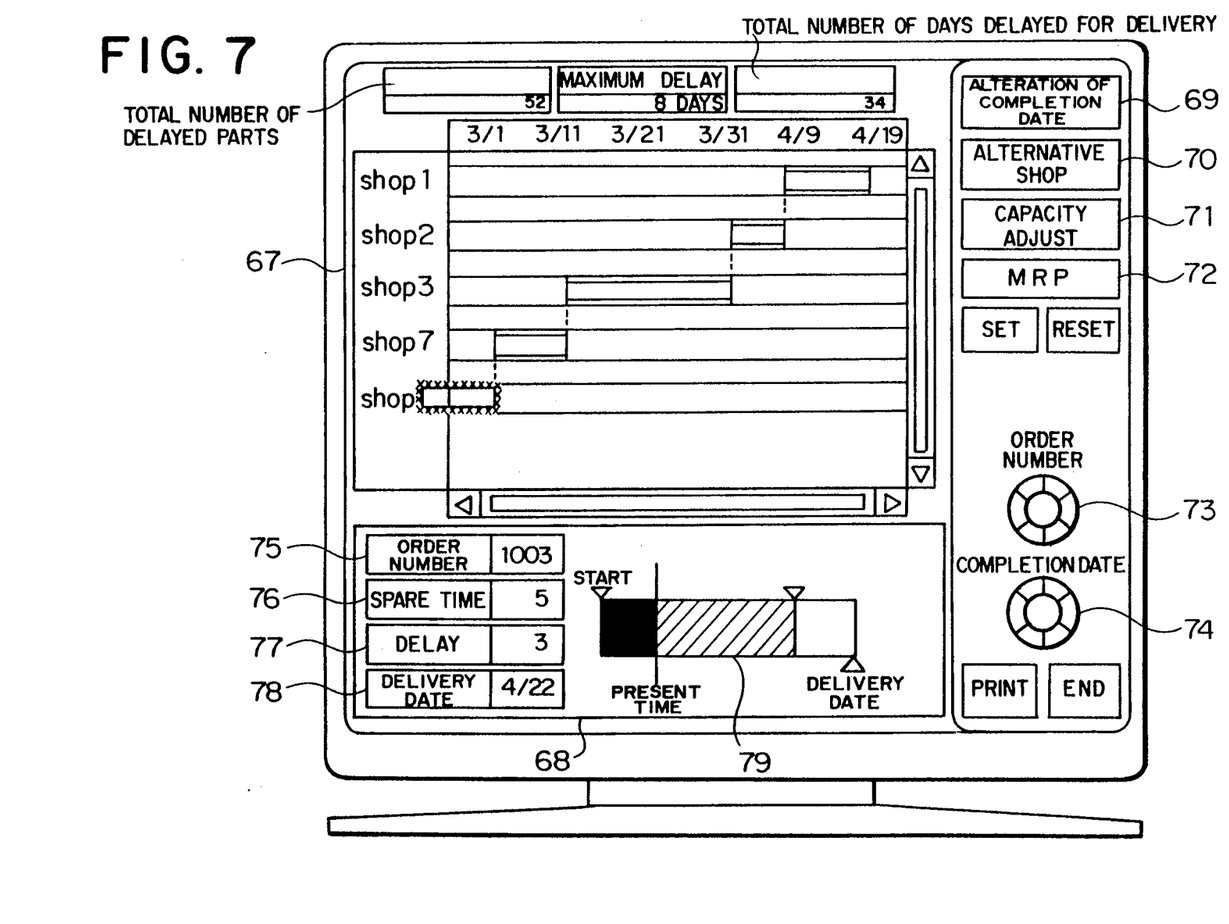
FIG. 7 is a view showing an example of display of a product completion data alteration.

Next, description will be turned to a method of adjusting the production schedule by changing or altering the product completion date (i.e. the date on which a product of concern will have to be completed). FIG. 7 shows a product completion date alteration display.

Referring to FIG. 7, the product completion date alteration display includes a critical path display field 67, a delay/spare-time display field 68, a product completion date alteration menu 69, an alternative shop menu 70, a capacity adjustment menu 71, a MRP execution command menu 72, an order number alteration dial 73 and a product completion data alternation dial 74. The display shown in FIG. 7 can be generated, for example, by selecting the product completion date alteration menu 55 shown in FIG. 6 with the mouse.

The critical path display field 67 shown in FIG. 7 is equivalent to the field 53 shown in FIG. 6.

The delay/spare-time display field 68 contains an order number area 75, a spare-time area 76, a delay area 77, an appointed-delivery date area 78 and a delay/spare-time bar graph area 79.

Referring to the delay/spare-time bar graph representation 79, a segment in black extending between points labeled "CURRENT" and "START" indicates delay in terms of the number of days, while a white segment between "COMPLETION" and "DELIVERY DATE" represents an available period in terms of the number of days.

The data "DELIVERY DATE" means the date of delivery appointed to the customer, and the data labeled "COMPLETION" means the date at which the product is scheduled to be completed on the production schedule. Ordinarily, in planning the production schedule, the product completion date is generally determined with some tolerance to the appointed date of delivery.

Under the circumstances, there may arise a possibility of altering the scheduled product completion date so that it lies closer to the appointed delivery date for the product suffering the delay for the accommodation thereof.

The production schedule alteration (adjustment) by changing the scheduled product completion date can executed through the procedure described below.

① Selection of the order ID number for which the completion date is to be altered:

When a plurality of critical paths are displayed, it is determined for which of the product order numbers the scheduled product completion date is to be selected for alteration or adjustment. For the selection of the order number, the order number change-over dial 73 is picked with the mouse. In the case of the two-button type mouse, actuation of the left button results in an increase of the order number while manipulation of the right button decreases the order number. Since only one critical path is shown in FIG. 7, the order number 1003 is selected as the objective for alteration of the scheduled product completion date.

② Alteration of scheduled product completion date:

The scheduled product completion date is altered by picking the completion date changing dial 74. In the case of the two-button type mouse, the left button is used for setting earlier the completion date (by moving the label "COMPLETION" to the left) while the right button serves to set later the completion date (by moving the label "COMPLETION" to the right).

③ Execution of MRP calculation:

The data input/output unit 12 issues the product completion date alteration command 16 to the completion date alteration module 5 on the basis of the result of the alteration of the scheduled completion date executed at the step 2. The completion date alteration module 5 supplies the result of alteration of the scheduled product completion date to the MRP execution module 2 together with a MRP execution command 23. In response, the MRP execution module 2 performs MRP calculation on the basis of the relevant data 28 supplied from the data input/output unit 11 in consideration of the result of alteration of the scheduled product completion date. The result 27 of the MRP calculation is stored in the data storage 11. Further, the MRP execution module 2 outputs a work demand calculation command 25 to the work demand calculating module 3, which responds thereto by calculating the work demand. The result 26 of this calculation is also stored in the data storage 11.

④ Alteration of critical path/delay/spare-time displays:

The data input/output unit 12 fetches the MRP execution result 21 from the data storage 11 to correct the critical path and delay/spare-time representations being displayed.

By executing the abovementioned procedure steps ① to ④, the operator can easily alter the scheduled date of completion of the product through simplified manipulation and at the same time can confirm on an on-line basis what influence will be exerted to the production schedule.

Figure 8:
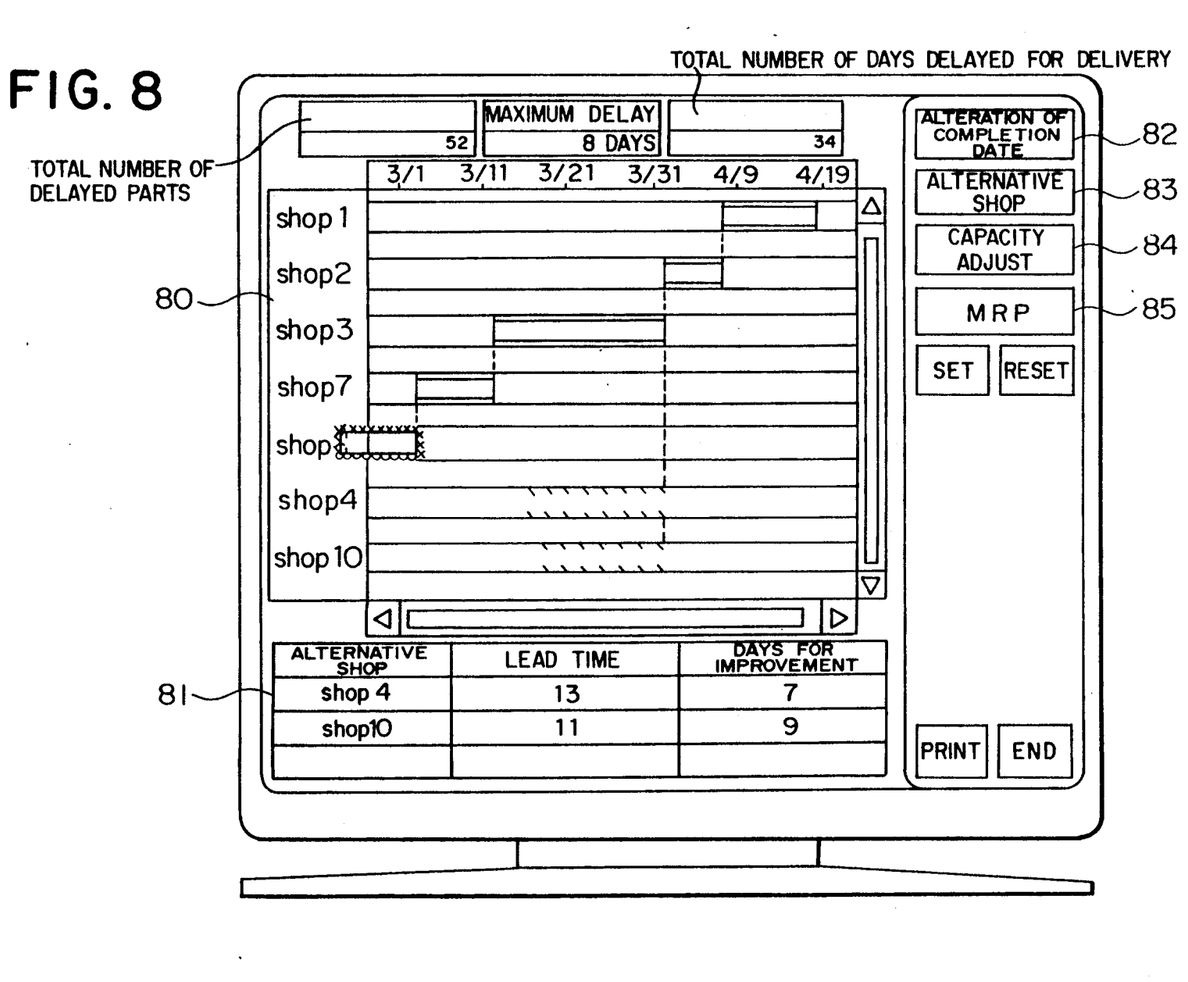
FIG. 8 is a view showing an example of display of a shop alteration.

Next, description will be turned to a method of adjusting the production schedule by altering the shops. FIG. 8 shows an example of the shop alteration display.

Referring to FIG. 8, the shop alteration display contains a critical path display field 80, an alternative shop display field 81, a scheduled product completion date alteration menu 82, an alternative shop menu 83, a capacity adjusting menu 84, a MRP execution command menu 85 and so forth. Parenthetically, the display shown in FIG. 8 can be generated by picking with the mouse the alternative shop menu 56 or 70 shown in FIG. 6 or FIG. 7.

The critical path display 80 shown in FIG. 8 corresponds to that (53) shown in FIG. 6.

In the alternative shop display field 81, there are displayed a group of shops capable of executing operations or works equivalent to those involved in the critical path as selected, the lead time in each of the alternative shops and the improvement in terms of days (i.e. the number of days by which the lead time is shortened) expected to be achieved when the alternative shop is adopted.

Accordingly, assuming now that the alternative shop exists in a given process or section of the critical path, this means that there is a possibility of canceling out the delay by adopting the alternative shop.

The production schedule adjustment while altering or changing the shop can be executed through a procedure described below.

① Selection of process for shop alteration:

In the critical path display field 80, the process for which the shop is to be altered or changed is selected with the aid of the mouse. For example, an area "SHOP 3" indicated as enclosed by a thick solid line is picked with the mouse. When the alternative shop 81 exists, this shop is also displayed in the critical path field 80 in such a format as illustrated in FIG. 8.

② Selection of alternative shop:

By picking the shop identifier or name in the alternative shop display field 81 with the mouse, the alternative shop is selected.

③ Execution of MRP calculation:

The data input/output unit 12 issues an alternative shop change command 17 to the alternative shop change module 6 on the basis of the result of the alternative shop selection in the step 2. In response, the alternative shop change module 6 issues a MRP execution command 24 to the MRP execution module 2 together with the result of the shop alteration. The MRP execution module 2 fetches data for MRP calculation from the data storage 11 and performs the MRP calculation on the data while taking into consideration the result of the shop alteration. The calculation result 27 is then loaded in the data storage 11. Further, the MRP execution module 2 outputs a work demand calculation command 25 to the work demand calculation module 3 which responds thereto by calculating the work demand. The result 26 of the work demand calculation is also loaded in the data storage 11.

④ Alteration of critical path display:

The data input/output unit 12 fetches the result 21 of MRP execution from the data storage 11 to correct the critical path after the alternative shop has been adopted. The corrected critical path is then displayed.

Through realization of the functions or steps ① to ④ mentioned above, the operator can easily change or alter the shop through simplified procedure and at the same time can confirm what influence the shop alteration will exert to the production schedule.

Next, a procedure for automatically generating initial plan data for the production schedule will be described below.

① When a command "INITIAL PLAN" from the command menus shown in FIG. 2 is picked by manipulating the mouse, the input/output unit 12 shown in FIG. 1 issues an initial plan data generating command 35 to the initial plan data generating module 8.

② The initial plan data generating module 8 issues first a MPS generation command 29 to the MPS generation module 9 which responds thereto by fetching data such as the product specifications, the appointed date of delivery and the process state 30 from the data storage 11 to thereby generate a MPS (master production schedule), the result of which is loaded in the data storage 11 as indicated by 31.

③ Next, the initial plan data generating module 8 issues a work demand estimation command 32 to the work demand estimation module 10 which responds to the command by fetching the MPS 33 from the storage 11 to make estimation of the work demand, the result of which is placed in the data storage 11 as indicated by 34.

④ The initial plan data generating module 8 now issues a lead time estimation command 38 to the lead time estimation module 1 which responds to the command by fetching the work demand and the capacity 13 at the current time point from the data storage 11 to thereby estimate an updated lead time, the result of which is transferred to the data storage 11, as indicated by 14.

⑤ Finally, the initial plan data generating module 8 issues a MRP execution command 37 to the MRP execution module 2 which responds thereto by fetching data sets 28 as required from the data storage 11 to execute the MRP calculation, the result of which is stored in the data storage module 11 as the initial plan data.

By executing the procedure including the steps ① to ⑤ mentioned above, it is possible to estimate in a fully automated manner the work demand and the lead time and to create the production schedule by taking into account the product specifications, the appointed date of delivery and the process state.

Finally, description will be directed to the principle underlying the lead time estimation module and the work demand estimation module.

As a basic module for the lead time estimation module and the work demand estimating module, there may be employed, for example, neural networks.

The neural network has pattern translation capability for translation of patterns between input data and output data as well as a pattern learning capability. Accordingly, in conjunction with the lead time estimation function and the work demand estimating function, the associated neural networks may be taught with data exemplified below for making it possible for them to perform estimation (i.e. calculation through pattern translation) of the lead time and the work demand.

1) Lead time estimation

Input: capacity and work demand
Output: lead time
2) Work demand estimation
Input: MPS
Output: work demand For particulars of the neural network theory, reference may be made to Rumelhart D. E., McClelland J. L. and The PDP Research group, 1986, Parallel Distributed Processing: MIT Press.

By virtue of the arrangements of the manufacturing planning system according to the invention described in the foregoing, there can be achieved advantageous effects mentioned below.

1) Because the production schedule can be created and adjusted while calculating sequentially the work demand and the lead time by taking into account the product specifications, the appointed date of delivery, the process or shop states and the capacity (production capability) as well as changes of them, the manufacturing planning can timely be carried out with high accuracy.

2) Owing to the critical path display, understanding or recognition of the critical path can be facilitated so that the supervisor can easily make decisions as to the measures to be taken for mitigating a heavy load, whenever it is required.

3) By virtue of the production capacity adjusting function, the scheduler can easily alter the capacity or production capability through simplified manipulation and at the same time can confirm on an on-line basis what influence the change or alteration of the capacity will exert onto the production schedule. In this way, the system can aid the operator in his or her decision-making in the course of execution of the production schedule.

4) Due to the product completion data adjusting function, the operator can easily alter the date at which the product is to be completed through a simplified procedure and at the same time can confirm on an on-line basis the influence which the change of the product completion date exerts to the manufacturing schedule. Thus, the system can aid the operator in making decisions involved in the course of executing the manufacturing plan.

5) Owing to the shop alteration function, the supervisor can alter the shop through a simple procedure and at the same time can confirm on an on-line basis what kind of influence is brought about in the production schedule. In this manner, the system can aid the planner in making decisions in the course of execution of the production schedule.

We claim:

1. A manufacturing planning system, comprising:
    data input/output means having a data input/output display function and an arithmetic function;
    lead time estimating means for estimating a lead time on the basis of a production capacity and a work demand;
    MRP executing means for performing calculation of amounts of materials as required;
    work demand calculating means for calculating said work demand in response to a command issued by said MRP executing means;
    problem analyzing means for analyzing a problem on the basis of output of said MRP executing means in response to a command issued by said data input/output means;
    capacity adjusting means for commanding outputting of the result of calculation from said MRP executing means in response to a command issued by said data input/output means; and
    data storage means;
    wherein the result of adjustment of a production schedule made by calculating the lead time in consideration of said work demand and said capacity is outputted.

2. A manufacturing planning system according to claim 1, further comprising:
    MPS generating means for generating a master production schedule on the basis of product specifications, appointed date of delivery and production process states;
    initial plan data generating means for issuing sequentially a command for generation of said master production schedule, a command for estimation of a work demand, a command for estimation of a lead time and a command for execution of calculation to said MRP executing means; and
    work demand estimating means for estimating the amount of work in response to a command issued by said initial plan data generating means;
    wherein a production schedule is created on the basis of said product specifications, said appointed date of delivery and said production process states and wherein result of production schedule adjustment made by calculating the lead time in consideration of said work demand and said capacity is outputted.

3. A manufacturing planning system according to claim 2, further comprising:
    product completion data adjusting means responsive to a command of said data input/output means for adjusting the product completion date at which the product is scheduled to be completed, and outputting the result of adjustment of said product completion date.

4. A manufacturing planning system according to claim 3, further comprising:
    alternative shop designating means for designating an alternative shop in response to a command of said data input/output means to output said designated alternative shop to said MRP execution means.

5. A manufacturing planning system according to claim 1, further comprising:
    display means for displaying a shop to which a part providing a cause for delay is related and pointing out a problem by displaying simultaneously load and capacity states of said shop on a time-interval basis.

6. A manufacturing planning system according to claim 2, further comprising:
    display means for displaying a shop to which a part providing a cause for delay is related and pointing out a problem by displaying simultaneously load and capacity states of said shop on a time-interval basis.

7. A manufacturing planning system according to claim 3, further comprising:
    display means for displaying a shop to which a part providing a cause for delay is related and pointing out a problem by displaying simultaneously load and capacity states of said shop on a time-interval basis.

8. A manufacturing planning system according to claim 4, further comprising:

display means for displaying a shop to which a part providing a cause for delay is related and pointing out a problem by displaying simultaneously load and capacity states of said shop on a time-interval basis.

9. A manufacturing planning system according to claim 1, further comprising:
display means for displaying on an on-line basis alteration of production capacity resulting from the adjustment performed by said capacity adjusting means together with alteration of production process accompanying said alteration of the capacity.

10. A manufacturing planning system according to claim 3, further comprising:
display means for displaying on an on-line basis alteration of said product completion date resulting from the adjustment by said product completion date adjusting means together with alteration of production process accompanying said alteration of the product completion date.

11. A manufacturing planning system according to claim 4, further comprising:
display means for displaying on an on-line basis alteration of the shop states resulting from the adjustment by said alternative shop designating means together with alteration of the production process accompanying said shop alteration.

* * * * *